(12) United States Patent
Short et al.

(10) Patent No.: US 6,178,529 B1
(45) Date of Patent: Jan. 23, 2001

(54) METHOD AND SYSTEM FOR RESOURCE MONITORING OF DISPARATE RESOURCES IN A SERVER CLUSTER

(75) Inventors: Robert T. Short, Kirkland; Rod Gamache, Issaquah; Michael T. Massa; John D. Vert, both of Seattle, all of WA (US)

(73) Assignee: Microsoft Corporation, Redmond, WA (US)

( * ) Notice: Under 35 U.S.C. 154(b), the term of this patent shall be extended for 0 days.

(21) Appl. No.: 08/963,049

(22) Filed: Nov. 3, 1997

(51) Int. Cl.$^7$ .................................................. G06F 9/45

(52) U.S. Cl. ........................ 714/51; 709/332; 709/223

(58) Field of Search ..................... 714/47, 39, 51, 714/48, 49, 25, 15; 709/100, 104, 223, 226, 304, 229, 224, 331, 332; 717/11, 10; 707/203, 202

(56) References Cited

U.S. PATENT DOCUMENTS

| | | |
|---|---|---|
| 4,736,393 | 4/1988 | Grimes et al. . |
| 5,021,949 | 6/1991 | Morten et al. . |
| 5,027,269 | 6/1991 | Grant et al. . |
| 5,117,352 | 5/1992 | Falek . |
| 5,128,885 * | 7/1992 | Janus et al. ............................. 714/45 |
| 5,165,018 * | 11/1992 | Simor ................................... 709/226 |
| 5,301,337 * | 4/1994 | Wells et al. ........................... 709/104 |
| 5,341,372 | 8/1994 | Kirkham . |
| 5,398,329 | 3/1995 | Hirata et al. . |
| 5,416,777 | 5/1995 | Kirkham . |
| 5,423,037 | 6/1995 | Hvasshovd . |
| 5,434,865 | 7/1995 | Kirkham . |
| 5,435,003 | 7/1995 | Chng et al. . |
| 5,490,270 | 2/1996 | Devarakonda et al. . |
| 5,491,800 * | 2/1996 | Goldsmith et al. ................... 709/304 |
| 5,537,532 | 7/1996 | Chng et al. . |
| 5,568,491 * | 10/1996 | Beal et al. ............................. 714/26 |
| 5,666,538 | 9/1997 | DeNicola . |
| 5,710,727 * | 1/1998 | Mitchell et al. ...................... 709/104 |
| 5,715,389 * | 2/1998 | Komori et al. ......................... 714/47 |
| 5,734,899 * | 3/1998 | Yoshizawa et al. .................. 707/203 |
| 5,737,601 | 4/1998 | Jain et al. . |
| 5,745,669 | 4/1998 | Hugard et al. . |
| 5,751,963 * | 5/1998 | Umetsu ................................ 709/223 |
| 5,754,752 | 5/1998 | Sheh et al. . |
| 5,754,877 | 5/1998 | Hagersten et al. . |
| 5,757,642 | 5/1998 | Jones . |
| 5,768,523 * | 6/1998 | Schmidt ............................... 709/224 |

(List continued on next page.)

OTHER PUBLICATIONS

Islam et al "Extensible Resource Management for Cluster Computing" Distributed Computing Systems, May 1997.*
Chen et al "Designing Mobile Computing Systems Using Distributed Objects" IEEE Communications Magazine, Feb. 1997.*
Carr, Richard, "The Tandem Global Update Protocol," *Tandem Systems Review*, vol. 1, No. 2, 74–85 (1985).
Lamport, Leslie, *A Fast Mutual Exclusion Algorithm*, Digital Equipment Corporation, Oct. 31, 1986.
Lamport, Leslie, *The Part–Time parliament*, Digital Equipment Corporation, Sep. 1, 1989.

* cited by examiner

Primary Examiner—Robert W. Beausoliel, Jr.
Assistant Examiner—Christopher Revak
(74) Attorney, Agent, or Firm—Michalik & Wylie, PLLC

(57) ABSTRACT

A method and system in a server cluster for monitoring and controlling a resource object, such as a physical device or application. A cluster service connects to a resource monitoring component to control and monitor the health of one or more resource objects. The resource component includes a plurality of methods, common to all such resource components, for calling by the resource monitor to control and monitor operation of the resource object therethrough. The common methods enable the cluster server to treat all resources similarly without regard to the type of resource.

53 Claims, 5 Drawing Sheets

U.S. PATENT DOCUMENTS

| | | | |
|---|---|---|---|
| 5,768,524 | * | 6/1998 | Schmidt ................................ 709/224 |
| 5,781,737 | * | 7/1998 | Schmidt ................................ 709/224 |
| 5,787,247 | | 7/1998 | Norin et al. . |
| 5,794,253 | | 8/1998 | Norin et al. . |
| 5,805,839 | | 9/1998 | Singhal . |
| 5,806,875 | | 9/1998 | Jain et al. . |
| 5,812,779 | | 9/1998 | Ciscon et al. . |
| 5,815,649 | | 9/1998 | Utter et al. . |
| 5,819,019 | * | 10/1998 | Nelson ................................ 709/226 |
| 5,822,532 | * | 10/1998 | Ikeda ................................... 709/223 |
| 5,832,514 | | 11/1998 | Norin et al. . |
| 5,857,073 | | 1/1999 | Tsukamoto et al. . |
| 5,919,247 | | 7/1999 | Van Hoff et al. . |
| 5,933,422 | | 8/1999 | Kusano et al. . |
| 5,935,230 | | 8/1999 | Pinai et al. . |
| 5,940,870 | | 8/1999 | Chi et al. . |
| 5,946,689 | | 9/1999 | Yanaka et al. . |
| 5,963,960 | | 10/1999 | Swart et al. . |
| 5,966,511 | * | 10/1999 | Temma ................................... 714/47 |
| 5,968,121 | | 10/1999 | Logan et al. . |
| 5,968,140 | | 10/1999 | Hall . |
| 5,982,747 | | 11/1999 | Ramfelt et al. . |
| 5,991,771 | | 11/1999 | Falls et al. . |
| 5,991,893 | | 11/1999 | Snider . |
| 6,003,075 | | 12/1999 | Arendt et al. . |
| 6,044,367 | | 3/2000 | Wolff . |
| 6,047,323 | | 4/2000 | Krause . |
| 6,178,912 | * | 6/2000 | Buerger et al. ........................ 707/1 |

METHOD AND SYSTEM FOR RESOURCE MONITORING OF DISPARATE RESOURCES IN A SERVER CLUSTER

FIELD OF THE INVENTION

The invention relates generally to computer network servers, and more particularly to computer servers arranged in a server cluster.

BACKGROUND OF THE INVENTION

A server cluster is a group of at least two independent servers connected by a network and managed as a single system. The clustering of servers provides a number of benefits over independent servers. One important benefit is that cluster software, which is run on each of the servers in a cluster, automatically detects application failures or the failure of another server in the cluster. Upon detection of such failures, failed applications and the like can be quickly restarted on a surviving server, with no substantial reduction in service. Indeed, clients of a Windows NT cluster believe they are connecting with a physical system, but are actually connecting to a service which may be provided by one of several systems. To this end, clients create a TCP/IP session with a service in the cluster using a known IP address. This address appears to the cluster software as a resource in the same group (i.e., a collection of resources managed as a single unit) as the application providing the service. In the event of a failure the cluster service "moves" the entire group to another system.

Other benefits include the ability for administrators to inspect the status of cluster resources, and accordingly balance workloads among different servers in the cluster to improve performance. Dynamic load balancing is also available. Such manageability also provides administrators with the ability to update one server in a cluster without taking important data and applications offline. As can be appreciated, server clusters are used in critical database management, file and intranet data sharing, messaging, general business applications and the like.

A cluster works with a large number of basic system components, known as resource objects, which provide some service to clients in a client/server environment or to other components within the system. Resource objects range from physical devices, such as disks, to purely software constructs, such as processes, databases, and IP addresses.

As can be appreciated, these resource objects are rather disparate in nature. Notwithstanding, the cluster software on each system needs to control and monitor the operation of the resource objects on its systems, regardless of their type. For example, the Windows NT Cluster design provides failure detectors and recovery mechanisms for working with a system's resources. However, because of the widely disparate types of resource objects, the software for resource monitoring heretofore needed to be highly complex so that the cluster was able deal with each type of resource object it was controlling.

SUMMARY OF THE INVENTION

Accordingly, the present invention provides an improved method and system to facilitate the control and monitoring of disparate resources. The method and system enables cluster software to control and monitor resources and handle failure recovery thereof in a simple and common manner, regardless of the type of resource. The method and system is simple to implement, reliable and extensible to future methods and improvements.

Briefly, the present invention provides a method and system in a server cluster for monitoring and controlling a resource object. A resource component such as a dynamic link library is connected to the resource object, such as a physical device or application, for management thereof. A resource monitor preferably connects the resource component to the cluster service. The resource component includes a plurality of methods that are common to the resource components. The methods are called by the resource monitor to control and monitor operation of the resource object through the resource component. In this manner, the cluster service is able to treat all resource objects in the same manner without regard to the type of object.

Other benefits and advantages will become apparent from the following detailed description when taken in conjunction with the drawings, in which:

DETAILED DESCRIPTION OF THE PREFERRED EMBODIMENT

Exemplary Operating Environment

Figure 1:
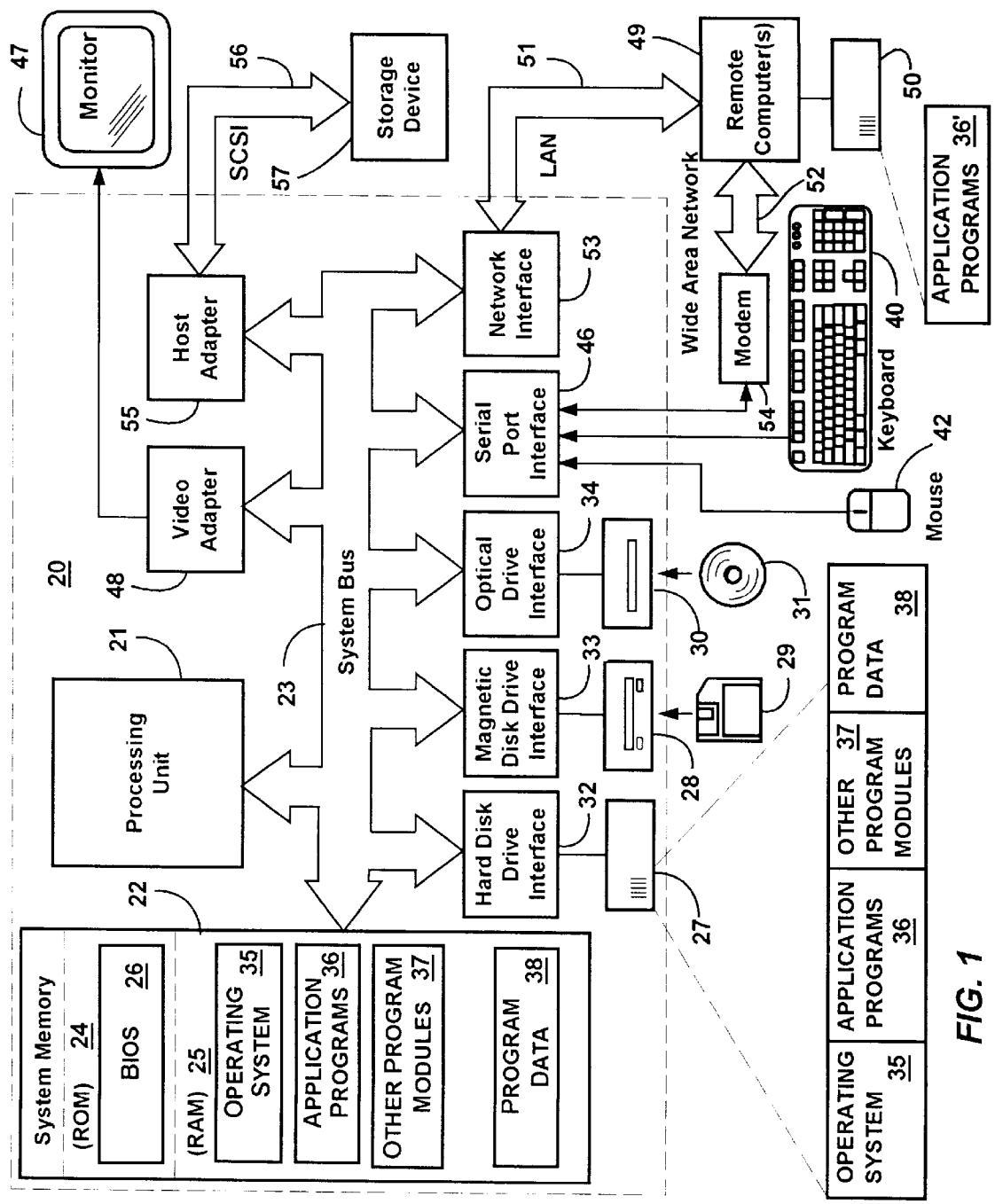
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like acting as a system (node) in a clustering environment. The computer 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 operates in a networked environment using logical connections to one or more remote computers 49. At least one such remote computer 49 is another system of a cluster communicating with the personal computer system 20 over the networked connection. Other remote computers 49 may be another personal computer such as a client computer, a server, a router, a network PC, a peer device or other common network system, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet. Other mechanisms suitable for connecting computers to form a cluster include direct connections such as over a serial or parallel cable, as well as wireless connections. When used in a LAN networking environment, as is typical for connecting systems of a cluster, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
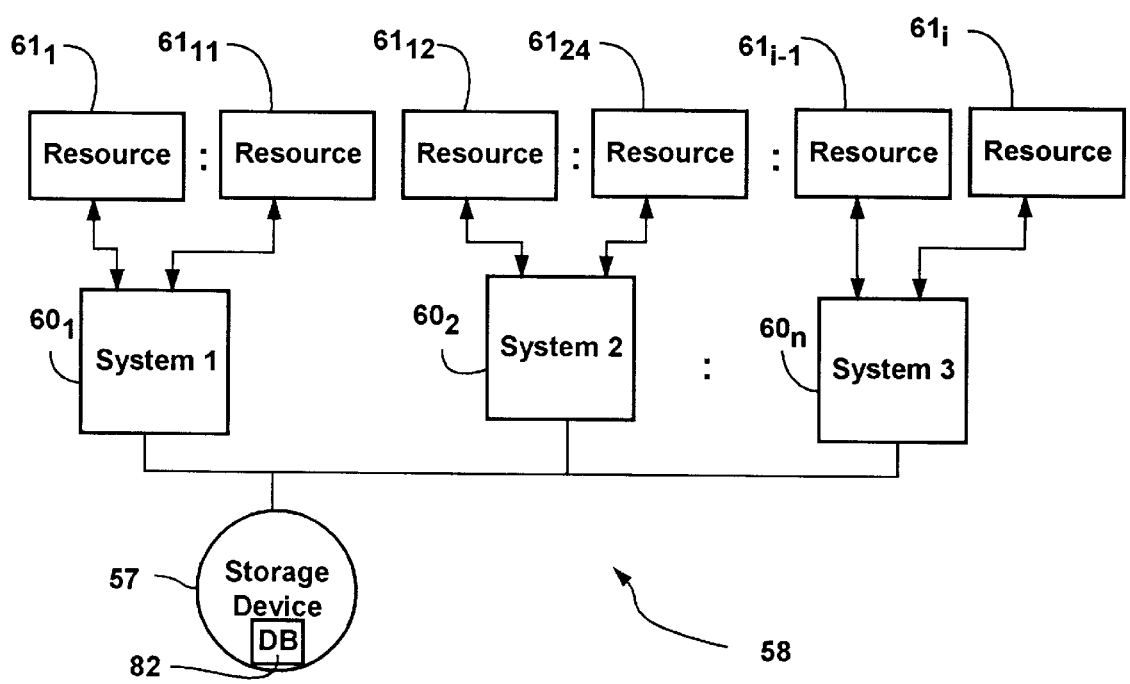
FIG. 2 is a block diagram representing a server cluster having a variety of resources associated therewith.

The preferred system 20 further includes a host adapter 55 or the like which connects the system bus 23 to a SCSI (Small Computer Standard Interface) bus 56 for communicating with at least one persistent memory storage device 57. Of course, other ways of connecting cluster systems to a storage device, including Fibre Channel, are equivalent. In any event, as shown in FIG. 2, the computer system 20 may comprise the system $60_1$ of a cluster 58 while one of the remote computers 49 may be similarly connected to the SCSI bus 56 and comprise the system $60_2$. As shown in FIG. 2, each of the systems $60_1$–$60_n$ have associated therewith one or more various disparate types of resources $61_1$–$61_i$ (components $62_1$–$62_j$ and objects $63_1$–$63_k$, described below). Note that at least one storage device 57 is preferably connected to the SCSI bus 56 as a quorum resource, described below. Alternatively, multiple storage devices may be connected to the SCSI bus 56, such as for purposes of resilience to disk failure through the use of multiple disks, i.e., software and/or hardware-based redundant arrays of inexpensive or independent disks (RAID).

A system administrator creates a new cluster by running a cluster installation utility on a system that then becomes a first member of the cluster 58. For a new cluster 58, a database is created and the initial cluster member information is added thereto. The administrator then configures any devices that are to be managed by the cluster software. At this time, a cluster exists having a single member, after which the installation procedure is run on each of the other members of the cluster. For each added member, the name of the existing cluster is entered and the new system receives a copy of the existing cluster database.

To accomplish cluster creation and to perform other administration of cluster resources, systems, and the cluster itself, a cluster application programming interface (API) 68 is provided. Applications and cluster management administration tools 69 call various interfaces in the API 68 using remote procedure calls (RPC), whether running in the cluster or on an external system. The various interfaces of the API 68 may be considered as being categorized by their association with a particular cluster component, i.e., systems, resources and the cluster itself. Resources are initially added to a cluster by such administrative tools 69.

Cluster Service Components

Figure 3:
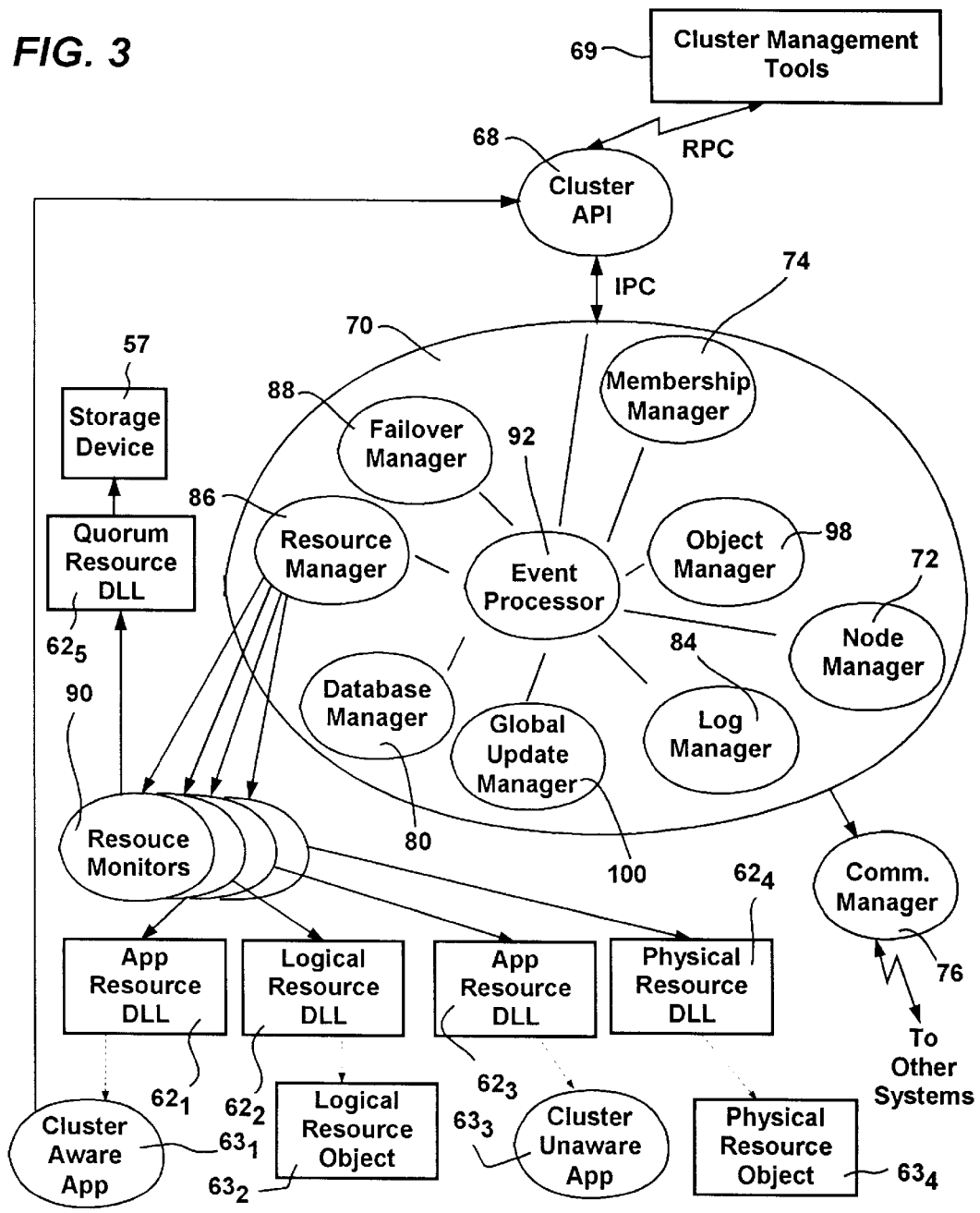
FIG. 3 is a representation of various components within the clustering service of a system for implementing the present invention.

FIG. 3 provides a representation of the cluster service components and their general relationships in a single system (e.g., $60_1$) of a Windows NT cluster. A cluster service 70 controls the cluster operation on a cluster system 58, and is preferably implemented as a Windows NT service. The cluster service 70 includes a node manager 72, which manages node configuration information and network configuration information (e.g., the paths between nodes). The node manager 72 operates in conjunction with a membership manager 74, which runs the protocols that determine what cluster membership is when a change (e.g., regroup) occurs. A communications manager 76 (kernel driver) manages communications with all other systems of the cluster 58 via one or more network paths. The communications manager 76 sends periodic messages, called heartbeats, to counterpart components on the other systems of the cluster 58 to provide a mechanism for detecting that the communications path is good and that the other systems are operational. Through the communications manager 76, the cluster service 70 is in constant communication with the other systems of the cluster. In a small cluster, communication is fully connected, i.e., all systems o f the cluster 58 are in direct communication with all other systems.

Systems (e.g., $60_1$–$60_5$) in the cluster 58 have the same view of cluster membership, and in the event that one system detects a communication failure with another system, the detecting system broadcasts a message to the cluster 58 causing other members to verify their view of the current cluster membership. This is known as a regroup event, during which writes to potentially shared devices are disabled until the membership has stabilized. If a system does not respond, it is removed from the cluster 58 and its active groups are failed over ("pulled") to one or more active systems. Note that the failure of a cluster service 70 also causes its locally managed resources to fail.

The cluster service 70 also includes a configuration database Manager 80 which implements the functions that maintain a cluster configuration database on a local device such as a disk and/or memory, and a configuration database 82 on the common persistent storage devices, (e.g., storage device $62_1$).The database maintains information about the physical and logical entities in the cluster 58, including the cluster itself, systems, resource types, quorum resource configuration, network configuration, groups, and resources. Note that both persistent and volatile information may be used to track the current and desired state of the cluster. The database manager 80 cooperates with counterpart database managers of systems in the cluster 58 to maintain configuration information consistently across the cluster 58. Global updates are used to ensure the consistency of the cluster database in all systems. The configuration database manager 80 also provides an interface to the configuration database 82 for use by the other cluster service 70 components. A logging manager 84 provides a facility that works with the database manager 80 to maintain cluster state information across a situation in which a cluster shuts down and a new cluster is later formed with no members common to the previous cluster, known as a temporal partition.

A resource manager 86 and failover manager 88 make resource/group management decisions and initiate appropriate actions, such as startup, restart and failover. As described in more detail below, the resource manager 86 and failover manager 88 are responsible for stopping and starting the system's resources, managing resource dependencies, and for initiating failover of groups. A group is a collection of resources organized to allow an administrator to combine resources into larger logical units and manage them as a unit. Usually a group contains all of the elements needed to run a specific application, and for client systems to connect to the service provided by the application. For example, a group may include an application that depends on a network name, which in turn depends on an Internet Protocol (IP) address, all of which are collected in a single group. In a preferred arrangement, the dependencies of all resources in the group are maintained in a directed acyclic graph, known as a dependency tree, described in more detail below. Group operations performed on a group affect all resources contained within that group.

The resource manager 86 and failover manager 88 components receive resource and system state information from at least one resource monitor 90 and the node manager 72, for example, to make decisions about groups. The failover manager 88 is responsible for deciding which systems in the cluster should "own" which groups. Those systems that own individual Groups turn control of the resources within the group over to their respective resource managers 86. When failures of resources within a group cannot be handled by the owning system, then the failover manager 80 in the cluster service 70 re-arbitrates with other failover managers in the cluster 58 for ownership of the Group.

An event processor 92 connects all of the components of the cluster service 70 and handles common operations. The event processor 92 propagates events to and from applications (e.g., $63_1$ and $63_3$) and to and from the components within the cluster service 70, and also performs miscellaneous services such as delivering signal events to cluster-aware applications $63_1$. The event processor 92, in conjunction with an object manager 98, also maintains various cluster objects. A global update manager 100 operates to provide a global update service that is used by other components within the Cluster Service 70.

Systems in the cluster must maintain a consistent view of time. One of the systems, known as the time source and selected by the administrator, includes a resource that implements the time service. Note that the time service, which maintains consistent time within the cluster 58, is implemented as a resource rather than as part of the cluster service 70 itself.

From the point of view of other systems in the cluster 58 and management interfaces, systems in the cluster 58 may be in one of three distinct states, offline, online or paused. These states are visible to other systems in the cluster 58, and thus may be considered the state of the cluster service 70. When offline, a system is not a fully active member of the cluster 58. The system and its cluster service 70 may or may not be running. When online, a system is a fully active member of the cluster 58, and honors cluster database updates, can contribute one or more votes to a quorum algorithm, maintains heartbeats, and can own and run groups. Lastly, a paused system is a fully active member of the cluster 58, and thus honors cluster database update, can contribute votes to a quorum algorithm, and maintain heartbeats. Online and paused are treated as equivalent states by most of the cluster software, however, a system that is in the paused state cannot honor requests to take ownership of groups. The paused state is provided to allow certain maintenance to be performed.

Note that after initialization is complete, the external state of the system is offline. The event processor calls the node manager 72 to begin the process of joining or forming a cluster. To join a cluster, following the restart of a system, the cluster service 70 is started automatically. The system configures and mounts local, non-shared devices. Cluster-wide devices are left offline while booting, because they may be in use by another node. The system tries to communicate over the network with the last known members of the cluster 58. When the system discovers any member of the cluster, it performs an authentication sequence wherein the existing cluster system authenticates the newcomer and returns a status of success if authenticated, or fails the request if not. For example, if a system is not recognized as a member or its credentials are invalid, then the request to join the cluster is refused. If successful, the database in the arriving node is examined, and if it is out of date, it is sent an updated copy. The joining system uses this shared database to find shared resources and to bring them online as needed, and also to find other cluster members.

If a cluster is not found during the discovery process, a system will attempt to form its own cluster. In accordance with one aspect of the present invention and as described in more detail below, to form a cluster, the system gains exclusive access to a quorum resource (quorum device). In general, the quorum resource is used as a tie-breaker when booting a cluster and also to protect against more than one node forming its own cluster if communication fails in a multiple node cluster. The quorum resource is a special resource, often (but not necessarily) a disk that maintains the state of the cluster, which a node arbitrates for and needs possession of before it can form a cluster. Arbitration and exclusive possession of the quorum resource are described in detail below.

When leaving a cluster, a cluster member will send a ClusterExit message to all other members in the cluster, notifying them of its intent to leave the cluster. The exiting cluster member does not wait for any responses and immediately proceeds to shutdown all resources and close all connections managed by the cluster software. Sending a message to the other systems in the cluster when leaving saves the other systems from discovering the absence by a time-out operation.

Once online, a system can have groups thereon. A group can be "owned" by only one system at a time, and the individual resources within a group are present on the system which currently owns the Group. As a result, at any given instant, different resources within the same group cannot be owned by different systems across the cluster. Groups can be failed over or moved from one system to another as atomic units. Each group has a cluster-wide policy associated therewith comprising an ordered list of owners. A group fails over to systems in the listed order.

When an entire system in the cluster fails, its groups are pulled from the failed system to another system. This process is similar to pushing a group, but without the shutdown phase on the failed system. To determine what groups were running on the failed system, the systems maintain group information on each node of the cluster in a database to track which systems own which groups. To determine which system should take ownership of which groups, those systems capable of hosting the groups negotiate among themselves for ownership, based on system capabilities, current load, application feedback and/or the group's system preference list. Once negotiation of a group is complete, all members of the cluster update their databases to properly reflect which systems own which groups.

When a previously failed system comes back online, the failover manager 88 decides whether to move some groups back to that system, in an action referred to as failback. To automatically failback, groups require a defined preferred owner. Groups for which the newly online system is the preferred owner are pushed from the current owner to the new system. Protection, in the form of a timing window, is included to control when failback occurs.

Resource Control and Monitoring

Figure 4:
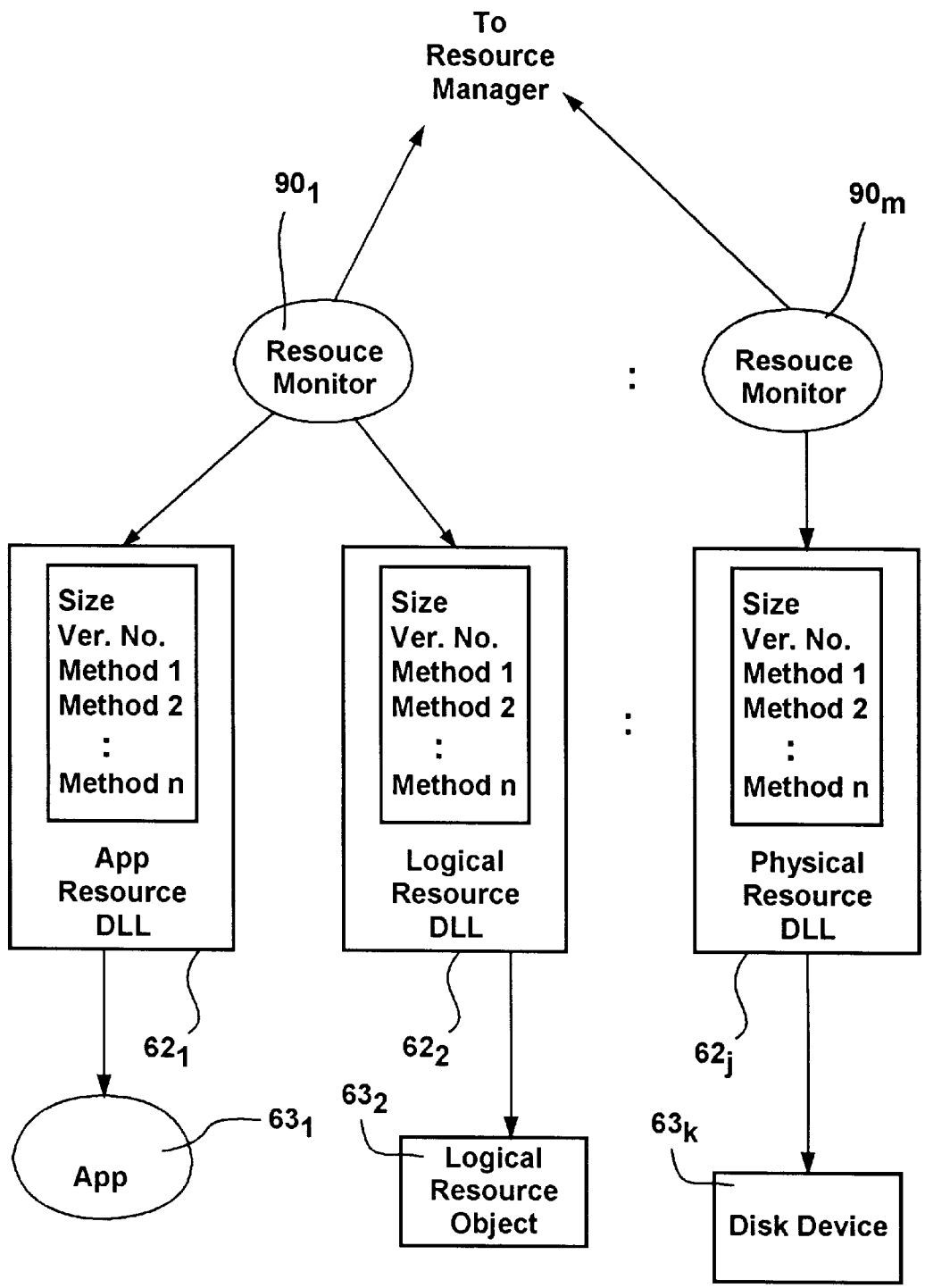
FIG. 4 is a block diagram representing resource components (DLLs) having methods for interfacing with a resource monitor in accordance with one aspect of the present invention.

A resource (e.g., $61_1$ of FIG. 2) is managed by the cluster software and can be available to (online on) only one system (e.g., $60_1$) in the cluster at any instance in time, although it can brought online on any system in the cluster. A resource such as $61_{12}$ may depend on other resources (e.g., $61_{24}$), however there are no circular dependencies allowed. This forms a directed acyclic graph, known as a dependency tree. If a resource $61_{12}$ does depend on other resources such as the resource $61_{24}$, the resource $61_{12}$ is brought online after the resource (or resources) $61_{24}$ on which it depends are already online, and is taken offline before those resources. Moreover, each resource (e.g., $61_1$) has an associated list of systems in the cluster 58 on which that particular resource may execute. For example, a disk resource (component $62_j$ and/or object $63_k$, FIG. 4) may only be hosted on systems that are physically connected to the disk device $63_k$. Also associated with each resource is a local restart policy, defining the desired action in the event that the resource cannot continue on the current system.

In accordance with one aspect of the present invention, resource components $62_1$–$62_j$ have a common set of states and methods that may be applied to any resource in order to generally control the resource and to detect failures or initiate failure recovery thereof. In this manner, the cluster software components are able to treat disparate resource objects such as physical devices and application programs identically, and do not have to be concerned about the type of resource object they are controlling. Instead, the controlling software treats the resource objects $63_1$–$63_k$ abstractly and only needs to know about the certain states within which a resource can exist, to generally control the resource and to handle failure recovery of the resource at an abstract level. To monitor the resources $61_1$–$61_i$, resource monitors $90_1$–$90_i$ run in one or more processes that may be part of the cluster service 70, but are shown herein as being separate from the cluster service 70 and communicating therewith via Remote Procedure Calls (RPC). As described in more detail below, the resource monitors $90_1$–$90_i$ control and monitor the health of one or more resources $61_1$–$61_i$ via callbacks thereto. For example, if a resource $61_{11}$ fails, the resource manager 86 may choose to restart the resource $61_{11}$ locally (e.g., up to some predetermined number of times), or to take the resource $61_{11}$ offline along with any resources dependent thereon. If the resource manager 86 takes the resource $61_{11}$ offline (such as if local restart attempts fail too many time consecutively), the resource manager 86 indicates to the failover manager 88 that the group including the resource $61_{11}$ should be restarted on another system (e.g., $60_2$) in the cluster, known as pushing the group to another system. A cluster administrator may also manually initiate such a group transfer. Both situations are similar, except that resources are gracefully shut down for a manually initiated failover, while they are forcefully shut down in the failure case.

In general, each of the resource monitors $90_1$–$90_i$ work to transition the resources $61_1$–$61_i$ from their initial offline (unavailable) states to an online (available) state. States common to resources include offline, offline pending, online, online pending and failed. There may be several iterations therethrough, where the state is pending or a failure may occur. However, the general objective of the resource monitors $90_1$–$90_i$ remains unchanged, i.e., to get the resources monitored thereby into a usable (online) state.

In a preferred embodiment, the resource components $62_1$–$62_j$ (FIG. 4) are implemented as Dynamically Linked Libraries (DLLs) loaded into the address space of its associated resource monitor $90_1$–$90_i$. For example, the resource DLLs $62_1$–$62_j$ may include physical disk, logical volume (consisting of one or more physical disks), file and print shares, network addresses and names, generic service or application, and Internet Server service DLLs. Certain resource components (e.g., provided by a single source) may be run in a single process, while other resources may be run in at least one other process. The resource components $62_1$–$62_j$ may be defined to run in separate processes, created by the Cluster Service 70 when creating resources. Alternatively, one or more of the resource components $62_1$–$62_j$ may run in the Cluster Service 70.

Each specific resource DLL $62_1$–$62_j$ is responsible for the actual creation, deletion and management of its specific resource object $63_1$–$63_k$ (physical device, application, other software construct or the like) that provides the service. In a system such as shown in FIG. 3, in keeping with the invention, the resource monitors 90 and other cluster software (e.g., the resource manager 86) are only responsible for monitoring the state of the resource objects $63_1$–$63_4$ (via their components $62_1$–$62_j$) and attempting to get those resource objects $63_1$–$63_4$ into a usable online state and keep them available.

In accordance with one aspect of the present invention, a common set of methods may be invoked for any resource $61_1$–$61_i$ as provided by the DLLs $62_1$–$62_j$. To provide extensibility and allow for adding more methods in the future, each resource DLL $62_1$–$62_j$ preferably exports only one function, a Startup function. The Startup function allows cluster software to pass into the DLL the version of the cluster software, and receive back from the DLL the version of the resource DLL. The resource DLL also returns a list of its method addresses in response to the Startup call. The Startup function thus provides for version control, since either the resource DLL or the cluster software can refuse to operate with a given version. Note that since the version number of the resource DLL is known from the startup call, the exact semantics of the method calls are known. Notwithstanding, the resource components $62_1$–$62_j$ may alternatively be implemented as COM (Component Object Model) objects, wherein version control is inherently provided for via the IUnknown interface. A detailed description of COM objects is provided in the reference entitled "Inside OLE," second edition, Kraig Brockschmidt (Microsoft Press). In any event, with the DLL model there is only one resource DLL entrypoint that need be exported by a resource DLL, i.e., the exported Startup method which returns a function table describing the supported version of the of the resource DLL along with the entrypoints for its methods.

The methods that may be applied to any resource object $63_1$–$63_k$ for control thereof include Open, (to create an instance of a specific resource), Close, (to destroy an instance of a specific resource), Online, (to bring the resource into a usable state), Offline, (to bring the resource into an unusable state) and Terminate, (a forced Offline method). Two other methods may be provided for monitoring the health of the resources, LooksAlive, (a cursory failure detector to monitor the health of a resource) and IsAlive (a thorough failure detector to monitor the health of a resource). Of course, other methods may be provided beyond this basic set, including methods directed to property management and quorum resources, described below.

The controlling Methods (Open, Close, Online, Offline and Terminate) are used to create and control an instance of a specific resource. A resource instance is the instantiation of control for some resource in the cluster, and is alternatively referred to herein as a RESID. A RESID is used by the resource DLL 62 to find the context that describes a particular resource object 63 (e.g., device or software) that it is to control. The RESID is a DWORD value returned on the Open call, and is supplied as an input on the other methods to refer to the specific resource (i.e., its context) that was described on the Open call.

Figure 5:
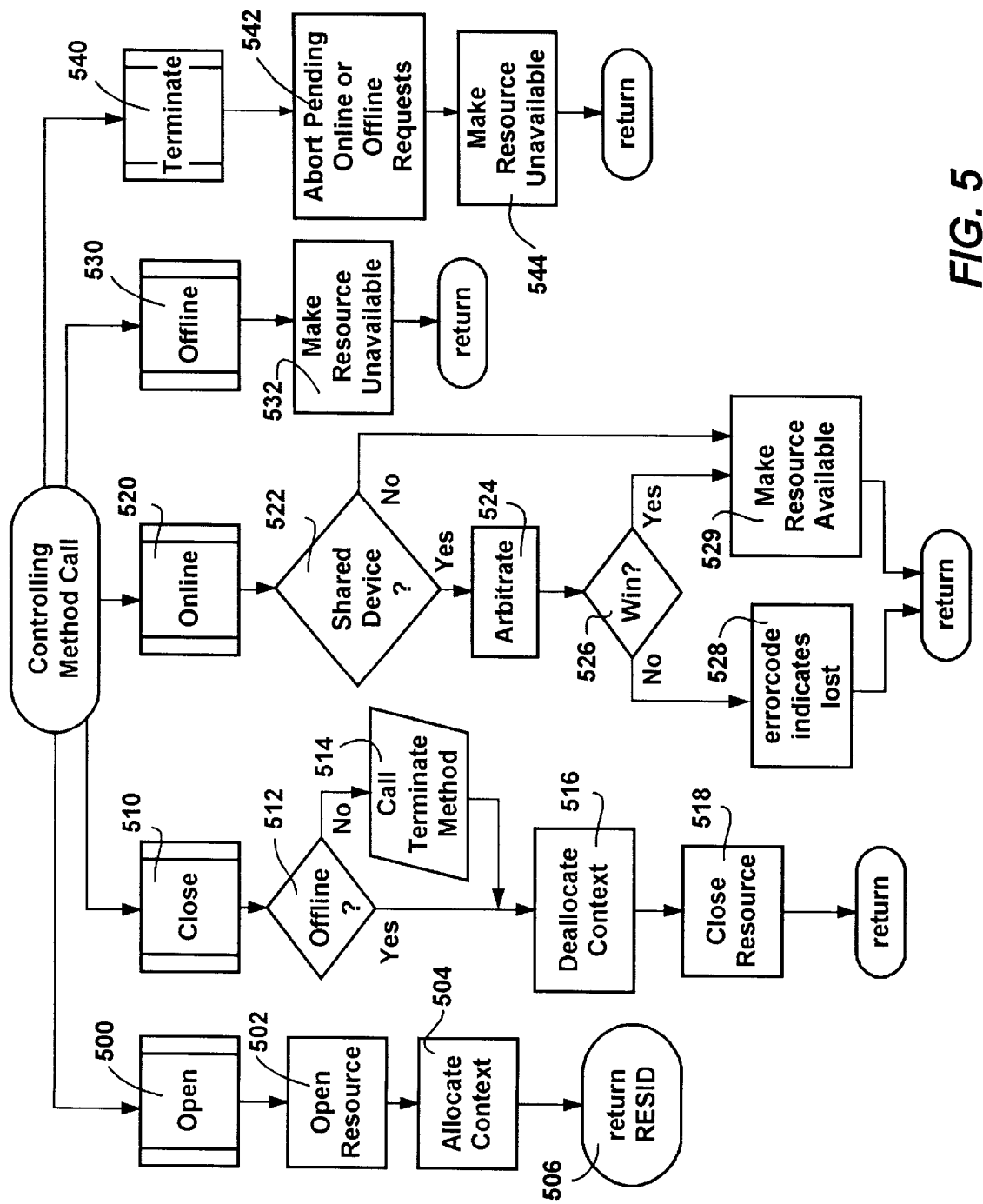
FIG. 5 is a diagram representing the general logic of the controlling methods provided by the resource components.

The Open and Close methods are used to create and destroy an instance of a given resource, respectively. As shown in FIG. 5, the Open method 500 opens the resource at step 502 (creates an instance of the resource by allocating data structures and the like at step 504), and returns a unique identifier (RESID) for the created resource instance. The Open method is only called once during the life of the resource instance.

The Close method 510 closes a resource (step 518) specified by a RESID passed thereto, by deallocating (step 516) the structures and other context allocated for that resource instance on the Open call. Note that if the resource is not in the offline state prior to closing as detected by step 512, then the resource should be taken offline at step 514 (such as by calling the Terminate method, described below) before performing the close operation. Close, like Open, is only called once in the life of a resource instance.

The Online method instructs the resource DLL (e.g., $62_1$) to make a specific instance of a resource object $63_1$ available (step 529) for use by the local system $60_1$. For example, in the case of an application, this might require running the application on the local system $60_1$. For a disk device, making a specific instance of a resource object available typically means making a disk device available to the local system, and mounting the file system. In keeping with the present invention, the actual mechanism required to make a resource usable is unknown to the controlling cluster software, as the cluster software is only concerned that an online state is achieved. Note that if at step 522 the resource object (e.g., $63_1$) is present on a shared medium such as a shared SCSI bus, the resource DLL $62_1$ should attempt to arbitrate for the resource object against other DLLs at step 524. If the resource DLL $62_1$ wins the arbitration (step 526), at step 529 the Online method makes the resource object $62_1$ available to the system $60_1$. If it loses the arbitration (step 526), at step 528 the Online method returns an errorcode indicating that the resource was arbitrated for with other systems but that one of the other systems won the arbitration.

The Offline method 530 instructs the resource DLL to make the specific instance of a resource object (e.g. $62_2$) unavailable (step 532) for use on the local system $60_1$. For example, this is done so that the instance of the resource could be made available to another system in the cluster 58. In the case of an application, making a resource object available to another system might require stopping the currently running instance of the application on the local system. For a disk, making a resource available to another system would typically require dismounting the file system and making the disk unavailable to the local system. The Offline method waits for any cleanup operations to complete before returning, and thus provides a graceful method for making the specified resource unavailable for use.

The Terminate method 540 is similar to the Offline method, except that it is used when a clean shutdown of the resource might not be possible. In response to a Terminate call, the resource DLL (e.g., $62_1$) might attempt to perform the same shutdown procedures as it does when its Offline method is invoked, or it might chose to perform an abortive shutdown. The abortive shutdown might have the side effect of throwing away potential state or data, but the Terminate resource method provides the DLL with the ability to handle the request as best as it can. The Terminate method takes the specified resource object offline immediately, whereby the resource becomes unavailable for use (step 544). Note that when the terminate call is received, if there is an Online thread waiting to come online or an Offline thread attempting to gracefully take the resource offline, then processing of the previous Online or Offline request is aborted (step 542), and the resource taken offline immediately (step 544).

The monitoring methods include the LooksAlive and IsAlive failure detection methods, which allow the cluster software to monitor the health of a specific instance of a resource. These methods are called from a timer mechanism within the cluster software, and are thus a synchronous polling operation.

The LooksAlive method is preferably a cursory failure detection method called to perform a quick check that determines if a specified resource object 63 appears to be online (available for use). The IsAlive failure detection method provides a thorough check of the resource object, and is ordinarily called less frequently than the LooksAlive failure detection method, as set by the system administrator. For example, the LooksAlive method may be called once every five seconds, with the IsAlive method called in place thereof every twelfth LooksAlive call (once every sixty seconds). However because the LooksAlive method may only perform a cursory check, the resource monitor 90 is less sure about the result of the LooksAlive detection method. Therefore, if a failure notification is received in response to a LooksAlive call, the resource monitor 90 may invoke the IsAlive failure detection method to substantiate the validity of the LooksAlive result. Of course, if the cost of a thorough check is deemed inexpensive, then the IsAlive method may be used exclusively.

In addition to the above synchronous polling notifications, the cluster software also provides for an asynchronous notification method. The asynchronous method is enabled through the Online method call, or via the completion of the Online call, when the resource is usable. To accomplish asynchronous notifications, the resource DLL 62 returns an event handle to the cluster software that is signaled whenever the specific instance of the resource object 63 fails. By having the resource DLL 62 or some other software agent signal the event handle, failure notifications can be done asynchronously, whereby the polling method may be disabled. As can be appreciated, asynchronous failure notification provides for real-time reporting of failures instead of waiting for the next polling interval. Thus, if an EventHandle is returned, then normal LooksAlive polling is not used for the resource and a failure is generated when the returned EventHandle is signaled. However, the normal IsAlive polling may still occur, allowing the resource DLL 62 to thoroughly check if a resource object 63 is still functioning properly.

Other features and enhancements may be provided with the methods to increase the overall perceived cluster performance. For example, with the exception of Open, Close and Terminate, no function within the resource DLL 62 should take more than a predetermined time on the order of a few hundred milliseconds to complete. This includes the Online and Offline entrypoints. Thus, if Online or Offline calls do take more than the predetermined time, thereby unduly blocking the execution of other threads, a thread may be started to complete the request, and an ERROR_IO_PENDING message returned immediately. The request will be completed when the created thread updates the status for the resource, by calling a callback routine or the like supplied on the Open call.

Similarly, if the polling functions (LooksAlive and IsAlive) take longer than 300 milliseconds, then a separate thread within the resource DLL 62 that performs these operations is started, and the poll entrypoints should return the results from the last poll performed by the separate threads executing within the resource DLL 62. The Open, Close and Terminate functions should complete as quickly as possible, but may take longer than 300 milliseconds. Notwithstanding, error detection is typically provided therefor in the cluster software.

Lastly, quorum resources are special resources that determine which system or systems can form a cluster. A quorum resource offers a method for arbitrating a quorum resource object, typically by challenging (or defending) for an exclusive reservation of a storage device (e.g., 57 of FIG. 2) such as a disk that ordinarily stores log data for the cluster. A method for releasing an exclusive reservation may also be provided. The general operation of quorum resources is described in more detail in co-pending United States Patent Application entitled "Method and System for Quorum Resource Arbitration in a Server Cluster," invented by the inventors of the present invention, assigned to the same assignee and filed concurrently herewith.

As can be seen from the foregoing detailed description, there is provided an improved method and system that facilitates the monitoring of disparate resources. The system and method enables cluster software to control and monitor resources and handle failure recovery thereof in a simple and common manner, regardless of the type of resource. The method and system is simple to implement, reliable and extensible to future methods and improvements.

While the invention is susceptible to various modifications and alternative constructions, a certain illustrated embodiment thereof is shown in the drawings and has been described above in detail. It should be understood, however, that there is no intention to limit the invention to the specific form disclosed, but on the contrary, the intention is to cover all modifications, alternative constructions, and equivalents falling within the spirit and scope of the invention.

What is claimed is:

1. In a server cluster having resource objects of different types, a system for monitoring and controlling a resource object, comprising, a cluster service, a resource component connected to the resource object for management thereof, the resource component including a plurality of methods common to resource components for calling by the cluster service to control operation of the resource object and monitor for states of the resource object therethrough, the resource object monitored for states common to the other resource objects of the server cluster independent of the type of each other resource object.

2. The system of claim 1 wherein the resource component comprises a dynamic link library.

3. The system of claim 1 wherein the resource component is connected to the cluster service through a resource monitor.

4. The system of claim 1 wherein one of the plurality of common methods causes the resource component to make the resource object available to a node of the cluster.

5. The system of claim 1 wherein the resource object comprises a physical device.

6. The system of claim 1 wherein the resource object comprises an application.

7. The system of claim 1 wherein the resource object comprises data.

8. The system of claim 1 wherein the resource object comprises a logical construct.

9. The system of claim 1 wherein the plurality of common methods includes an open command to create an instance of the resource component and a close command to close the instance of the resource.

10. The system of claim 1 wherein one of the plurality of common methods causes the resource component to make the resource object unavailable to a node of the cluster.

11. The system of claim 1 wherein one of the plurality of common methods causes the resource component to forcefully terminate the operation of the resource object.

12. The system of claim 1 wherein one of the plurality of common methods is periodically issued by the resource monitor to cause the resource component to check on the status of the resource object.

13. The system of claim 1 wherein the resource component includes means for asynchronously reporting an error in the resource object.

14. The system of claim 1 wherein the common set of methods comprise open, close, online, offline and terminate methods.

15. The system of claim 1 wherein the common set of states comprise at least one of an offline, offline pending, online, online pending and failed state.

16. The system of claim 1 wherein the common set of states comprise online and failed states, and wherein the cluster service changes the state of the resource object from a failed state to an online state.

17. The system of claim 16 wherein the cluster service changes the state of the resource object to the online state by moving the resource object to another server of the cluster.

18. In a server cluster, a process for monitoring a resource object, comprising, providing a cluster service, running a resource component for management of the resource object, the resource component including a plurality of methods common to resource components, and calling at least one of the methods of the resource component to monitor for states of the resource object therethrough, the resource object monitored for states included in a set of states, the set of states defined relative to a version and being independent of the type of the resource objects.

19. The process of claim 18 wherein running a resource component includes loading a dynamic link library.

20. The process of claim 18 further comprising calling at least one of the methods in the resource component to make the resource object available to a node of the cluster.

21. The process of claim 20 wherein the resource object is an application, and further comprising running the application on a node of the cluster in response to the method call.

22. The process of claim 18 further comprising calling at least one of the methods in the resource component to make the resource object unavailable to a node of the cluster.

23. The process of claim 18 further comprising calling at least one of the methods in the resource component to create an instance of the resource component.

24. The process of claim 18 further comprising calling at least one of the methods in the resource component to forcefully terminate the operation of the resource object.

25. The process of claim 18 wherein calling at least one of the methods of the resource component to monitor the state of the resource object includes periodically calling the resource component to check on the status of the resource object.

26. The process of claim 18 wherein calling at least one of the methods of the resource component to monitor the state of the resource object includes reporting an error in the resource object by an asynchronous callback from the resource component.

27. The process of claim 18 wherein the common set of methods comprise open, close, online, offline and terminate methods.

28. The process of claim 18 wherein the common set of states comprise at least one of an offline, offline pending, online, online pending and failed state.

29. The process of claim 18 wherein the common set of states comprise online and failed states, and further comprising changing the state of the resource object from a failed state to an online state.

30. The process of claim 29 wherein changing the state of the resource object to the online state includes moving the resource object to another server of the cluster.

31. The process of claim 18 further comprising controlling the resource object based on the state thereof.

32. In a server cluster having resource objects of different types, a process comprising, providing a resource component for each resource object, each resource component including a plurality of methods common to resource components, running the resource component, and monitoring the state of a resource object through at least one of the methods, the resource object monitored for states in a set of states common to other resource objects of the server cluster independent of the types of the other resource objects.

33. The process of claim 32 wherein monitoring the state of the resource object includes periodically calling the resource component to check on the status of the resource object.

34. The process of claim 32 wherein monitoring the state of the resource object includes reporting an error in the resource object by an asynchronous callback from the resource component.

35. The process of claim 32 wherein monitoring the state of the resource object includes determining whether a function completes before a predetermined time duration.

36. The process of claim 35 further comprising, starting a thread when the function fails to complete before the predetermined time duration.

37. The process of claim 36 wherein the thread completes a request with an error pending message.

38. The process of claim 32 wherein the common set of methods comprise open, close, online, offline and terminate methods.

39. The process of claim 32 wherein the common set of states comprise at least one of an offline, offline pending, online, online pending and failed state.

40. The process of claim 32 wherein the common set of states comprise online and failed states, and further comprising changing the state of the resource object from a failed state to an online state.

41. The process of claim 40 wherein changing the state of the resource object to the online state includes moving the resource object to another server of the cluster.

42. The process of claim 32 further comprising controlling the resource object based on the state thereof.

43. A computer-readable medium including computer-executable instructions, comprising:
   providing a resource object in a server cluster;
   running a resource component in the server cluster, the resource component including a plurality of methods common to resource components; and
   monitoring for at least one state of the resource object by calling at least one of the methods of the resource component, the at least one state being included in a set of states that is defined relative to a version and is common to resource objects of the server cluster independent of their type.

44. The computer-readable medium including computer-executable instructions of claim 43, wherein running a resource component includes loading a dynamic link library.

45. The computer-readable medium including computer-executable instructions of claim 43, wherein monitoring the state of the resource object includes periodically calling the resource component.

46. The computer-readable medium of claim 43 including further computer-executable instructions for, reporting an error in the resource object by an asynchronous callback from the resource component.

47. The computer-readable medium including computer-executable instructions of claim 43, wherein monitoring the state of the resource object includes determining whether a function completes before a time duration.

48. The computer-readable medium of claim 47 including further computer-executable instructions for, starting a thread when the function fails to complete before the time duration.

49. The computer-readable medium including computer-executable instructions of claim 48, wherein the thread completes a request with an error pending message.

50. The computer-readable medium of claim 43 including further computer-executable instructions for, calling at least one of the methods in the resource component to make the resource object available to a node of the cluster.

51. The computer-readable medium of claim 43 including further computer-executable instructions for, calling at least one of the methods in the resource component to make the resource object unavailable to a node of the cluster.

52. The computer-readable medium of claim 43 including further computer-executable instructions for, calling at least one of the methods in the resource component to forcefully terminate the operation of the resource object.

53. The computer-readable medium of claim 43 including further computer-executable instructions comprising controlling the resource object based on the state thereof.

* * * * *

UNITED STATES PATENT AND TRADEMARK OFFICE
CERTIFICATE OF CORRECTION

PATENT NO. : 6,178,529 B1  Page 1 of 1
APPLICATION NO. : 08/963049
DATED : January 23, 2001
INVENTOR(S) : Short et al.

It is certified that error appears in the above-identified patent and that said Letters Patent is hereby corrected as shown below:

IN THE SPECIFICATION:

In Column 4, line 21: "602" should read --$60_2$--.
In Column 8, line 20: This line should be indented as a new paragraph
In Column 8, line 32: "too many time consecutively" should read --too many times consecutively--.
In Column 9, line 34: "version of the of the resource" should read --version of the resource--.
In Column 10, line 32: "(e.g. $62_2$)" should read --(e.g., $62_2$)--.
In Column 10, line 50: "might chose to perform" should read --might choose to perform--.

Signed and Sealed this

Twenty-seventh Day of February, 2007

JON W. DUDAS
*Director of the United States Patent and Trademark Office*